United States Patent
Semenov et al.

(10) Patent No.: US 9,190,879 B2
(45) Date of Patent: Nov. 17, 2015

(54) LAMINATED ROTOR MACHINING ENHANCEMENT

(75) Inventors: Dmitry Yurevich Semenov, Moscow (RU); Anthony Salvatore Arrao, Clifton Park, NY (US); Richard Nils Dawson, Voorheesville, NY (US); Evgeny Victorovich Kazmin, Moscow (RU); Timothy Gerald Schmehl, Clifton Park, NY (US); Yury Danilovich Vinitsky, Moscow (RU)

(73) Assignee: General Electric Company, Schenectady, NY (US)

( * ) Notice: Subject to any disclaimer, the term of this patent is extended or adjusted under 35 U.S.C. 154(b) by 12 days.

(21) Appl. No.: 13/823,054

(22) PCT Filed: Jul. 6, 2011

(86) PCT No.: PCT/RU2011/000492
§ 371 (c)(1),
(2), (4) Date: Mar. 13, 2013

(87) PCT Pub. No.: WO2013/006079
PCT Pub. Date: Jan. 10, 2013

(65) Prior Publication Data
US 2014/0232234 A1   Aug. 21, 2014

(51) Int. Cl.
*H02K 1/26* (2006.01)
*H02K 1/28* (2006.01)
*H02K 1/16* (2006.01)
(Continued)

(52) U.S. Cl.
CPC ................. *H02K 1/28* (2013.01); *H02K 1/165* (2013.01); *H02K 1/265* (2013.01); *H02K 3/487* (2013.01); *H02K 15/024* (2013.01)

(58) Field of Classification Search
None
See application file for complete search history.

(56) References Cited

U.S. PATENT DOCUMENTS

| 383,659 A | 5/1888 | Schmid et al. |
| 464,026 A | 12/1891 | Kammeyer |

(Continued)

FOREIGN PATENT DOCUMENTS

| DE | 2815214 A1 | 10/1979 |
| DE | 3013704 A1 | 10/1981 |

(Continued)

OTHER PUBLICATIONS

Machine Translation of JP 2005-229767, Kazuhisa Takashima, "Rotating Electric Machine," Aug. 25, 2005.
(Continued)

*Primary Examiner* — Tran Nguyen
(74) *Attorney, Agent, or Firm* — Ernest G. Cusick; Hoffman Warnick LLC

(57) ABSTRACT

A laminated rotor for an electric machine is disclosed. In an embodiment, the rotor comprises a plurality of stacked laminations. Each lamination includes a plurality of radially extending slots arranged about a circumference thereof, and a first chamfer on a surface of each of the slots, wherein the surface mates with a wedge. The first chamfer connects the surface and a first face of the lamination. A stud member passes longitudinally through a hole in the lamination stack, a first end flange member on a first end of the lamination stack, and a second end flange member on a second end of the lamination stack. A first fastener is affixed to a first end of each of the at least one stud member; and a second fastener affixed to a second end of each of the at least one stud member.

20 Claims, 10 Drawing Sheets

(51) Int. Cl.
*H02K 3/487* (2006.01)
*H02K 15/02* (2006.01)

(56) References Cited

U.S. PATENT DOCUMENTS

| | | | |
|---|---|---|---|
| 780,085 A | 1/1905 | Behrend et al. | |
| 932,083 A | 8/1909 | Wouters | |
| 1,028,985 A | 6/1912 | Behrend | |
| 2,064,033 A * | 12/1936 | Rose | 310/262 |
| 3,119,033 A | 1/1964 | Horsley et al. | |
| 3,763,386 A | 10/1973 | Anderson, Jr. | |
| 3,783,317 A | 1/1974 | Sisk | |
| 3,965,382 A | 6/1976 | McCrosky et al. | |
| 4,121,926 A | 10/1978 | Ogawa et al. | |
| 4,152,610 A | 5/1979 | Wallenstein | |
| 4,259,603 A | 3/1981 | Uchiyama et al. | |
| 4,298,812 A | 11/1981 | Damiron et al. | |
| 4,315,301 A | 2/1982 | Jimena | |
| 4,363,986 A | 12/1982 | Joho et al. | |
| 4,489,249 A | 12/1984 | Olivier | |
| 4,503,377 A | 3/1985 | Kitabayashi et al. | |
| 4,614,888 A | 9/1986 | Mosher et al. | |
| 4,642,886 A | 2/1987 | Muck et al. | |
| 4,761,580 A * | 8/1988 | Hein et al. | 310/214 |
| 4,922,147 A | 5/1990 | Sismour, Jr. et al. | |
| 5,030,871 A * | 7/1991 | Shah et al. | 310/216.071 |
| 5,174,011 A | 12/1992 | Weigelt | |
| 5,495,133 A | 2/1996 | Bawin et al. | |
| 5,559,419 A | 9/1996 | Jansen et al. | |
| 5,685,063 A | 11/1997 | Prole et al. | |
| 5,742,515 A | 4/1998 | Runkle et al. | |
| 5,886,443 A | 3/1999 | Dymond et al. | |
| 5,892,306 A | 4/1999 | Lloyd | |
| 5,894,183 A | 4/1999 | Borchert | |
| 6,082,186 A | 7/2000 | Detwiler | |
| 6,177,750 B1 | 1/2001 | Tompkin | |
| 6,265,805 B1 | 7/2001 | Debleser | |
| 6,459,180 B1 | 10/2002 | Mori et al. | |
| 6,628,005 B2 | 9/2003 | Nelson et al. | |
| 6,710,497 B2 | 3/2004 | Wang et al. | |
| 6,734,585 B2 | 5/2004 | Tornquist et al. | |
| 6,774,522 B2 * | 8/2004 | Aoyama et al. | 310/214 |
| 7,275,442 B2 * | 10/2007 | Bentzel | 73/643 |
| 7,531,934 B2 | 5/2009 | Hang et al. | |
| 7,562,542 B2 | 7/2009 | Choi | |
| 7,626,309 B2 | 12/2009 | Watson | |
| 7,692,352 B2 | 4/2010 | Sirois | |
| 2002/0057027 A1 | 5/2002 | McLaren et al. | |
| 2003/0094872 A1 | 5/2003 | Tornquist et al. | |
| 2003/0102762 A1 | 6/2003 | Jansen et al. | |
| 2003/0201646 A1 | 10/2003 | Kaploun | |
| 2004/0164627 A1 | 8/2004 | Tornquist et al. | |
| 2005/0126230 A1 | 6/2005 | Choi | |
| 2006/0214645 A1 | 9/2006 | Rufer et al. | |
| 2006/0267441 A1 | 11/2006 | Hang et al. | |
| 2009/0123282 A1 | 5/2009 | Buskirk et al. | |
| 2010/0281688 A1 | 11/2010 | Keller et al. | |
| 2011/0080068 A1 * | 4/2011 | Dawson et al. | 310/216.114 |

FOREIGN PATENT DOCUMENTS

| | | |
|---|---|---|
| EP | 0320304 A1 | 6/1989 |
| EP | 0461733 A2 | 12/1991 |
| EP | 0484026 A2 | 5/1992 |
| EP | 0538472 A1 | 4/1993 |
| EP | 0484026 A3 | 10/1993 |
| EP | 0565312 A2 | 10/1993 |
| EP | 0577843 A1 | 1/1994 |
| EP | 0595609 A1 | 5/1994 |
| EP | 0632566 A1 | 1/1995 |
| EP | 0646937 A1 | 4/1995 |
| EP | 0657984 A1 | 6/1995 |
| EP | 0658895 A2 | 6/1995 |
| EP | 0565312 A3 | 12/1995 |
| EP | 0712198 A1 | 5/1996 |
| EP | 0728956 A1 | 8/1996 |
| EP | 0658895 A3 | 6/1997 |
| EP | 0538472 B1 | 10/1997 |
| EP | 0823771 A1 | 2/1998 |
| EP | 0577843 B1 | 3/1998 |
| EP | 0872944 A1 | 10/1998 |
| EP | 0622885 B1 | 9/2000 |
| EP | 1541739 A2 | 6/2005 |
| EP | 1796247 A2 | 6/2007 |
| EP | 1906509 A2 | 4/2008 |
| EP | 0872944 B1 | 5/2008 |
| EP | 1947758 A2 | 7/2008 |
| EP | 1962326 A1 | 8/2008 |
| EP | 1998425 A2 | 12/2008 |
| EP | 2083503 A2 | 7/2009 |
| EP | 2096735 A1 | 9/2009 |
| EP | 2099115 A2 | 9/2009 |
| EP | 2113987 A1 | 11/2009 |
| GB | 381641 A | 10/1932 |
| JP | 55034857 A2 | 3/1980 |
| JP | 57000054 A2 | 1/1982 |
| JP | 57046661 A | 3/1982 |
| JP | 57091656 A | 6/1982 |
| JP | 58051759 A2 | 3/1983 |
| JP | 60005764 A2 | 1/1985 |
| JP | 60035946 A2 | 2/1985 |
| JP | 60077646 A2 | 5/1985 |
| JP | 2188157 A2 | 7/1990 |
| JP | 4021338 A2 | 1/1992 |
| JP | 4178132 A2 | 6/1992 |
| JP | 5252679 A2 | 9/1993 |
| JP | 10290556 A2 | 10/1998 |
| JP | 2004140966 A | 5/2004 |
| JP | 2004343919 A2 | 12/2004 |
| JP | 2005229767 | 8/2005 |
| JP | 2006288061 A2 | 10/2006 |
| JP | 2010130842 A | 6/2010 |
| JP | 2010148294 A2 | 7/2010 |
| WO | 8500938 A1 | 2/1985 |
| WO | 2004079882 A1 | 9/2004 |
| WO | 2013006078 A1 | 1/2013 |
| WO | 2013112067 A1 | 8/2013 |

OTHER PUBLICATIONS

Tamai, Office Action Communication for U.S. Appl. No. 12/574,448 dated Aug. 12, 2011, 20 pages.
Tamai, Office Action Communication for U.S. Appl. No. 12/574,448 dated Dec. 23, 2011, 20 pages.
GB Intellectual Property Office, Search Report Under Section 17(5) for GB1016526.4 dated Feb. 1, 2011, 5 pages.
Patent Cooperation Treaty, International Search Report for PCT/RU2011/000492 dated Jul. 17, 2012, 4 pages.
Patent Cooperation Treaty, International Search Report for PCT/RU2011/000491 dated Jul. 2, 2012, 3 pages.
Office Action issued in connection with corresponding RU Application No. 2013158011 on Sep. 2, 2014.
Office Action for EP Application No. 11815734.6 dated Jun. 24, 2015, 5 pages.
Office Action for U.S. Appl. No. 13/823,369, dated Apr. 15, 2015, 29 pages.
International Search Report and Written Opinion for PCT/RU2012/00034, mailed Feb. 8, 2013, 20 pages.
International Preliminary Report on Patentability for PCT/RU2014/00034, dated Jul. 29, 2014, 16 pages.
US. Appl. No. 13/822,767, Office Action dated Sep. 8, 2015, 40 pgs.

* cited by examiner

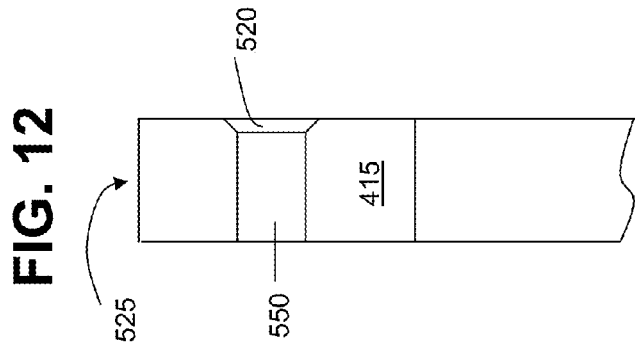
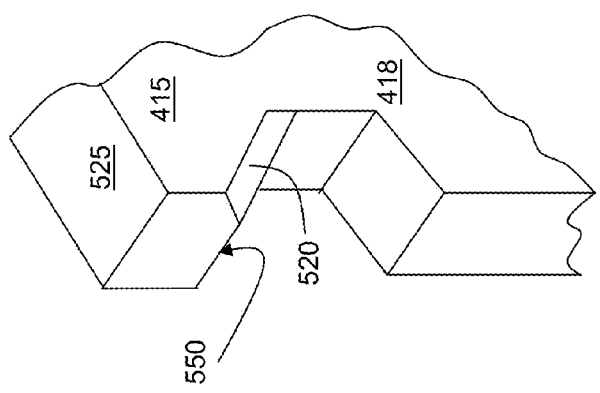
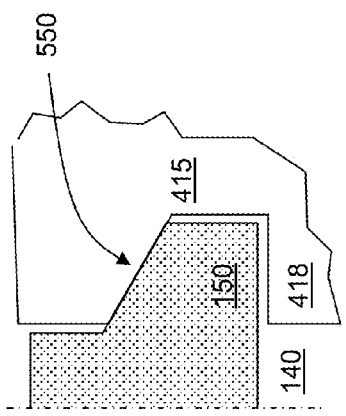
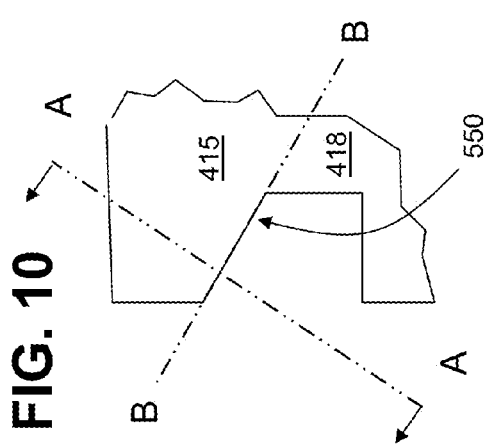

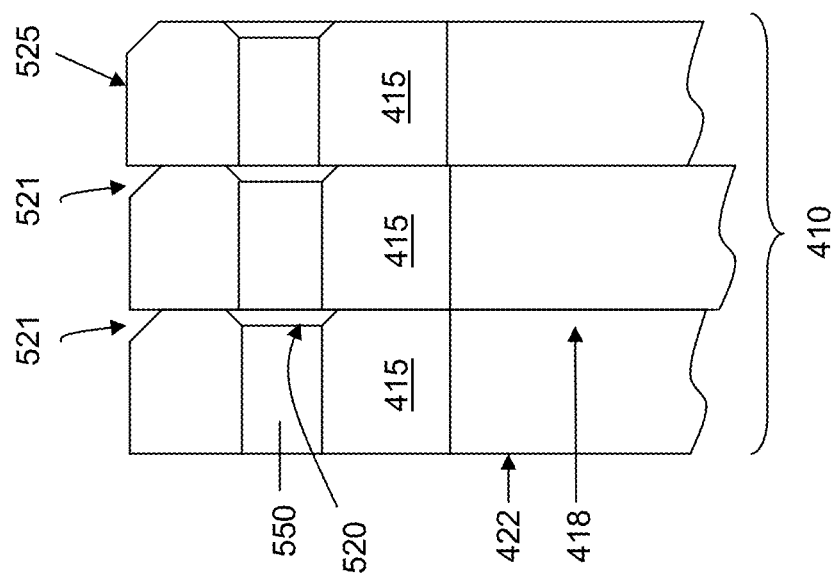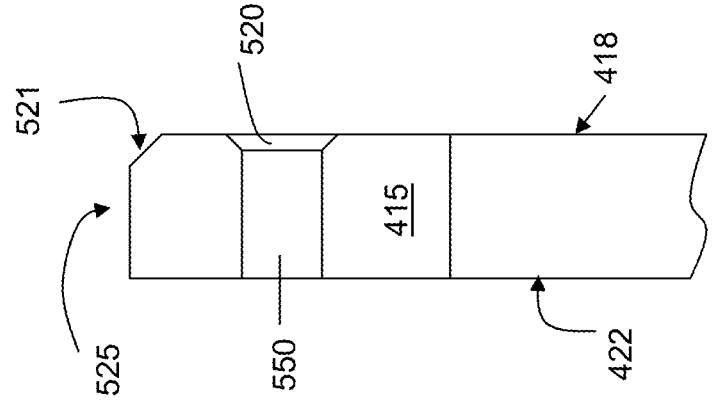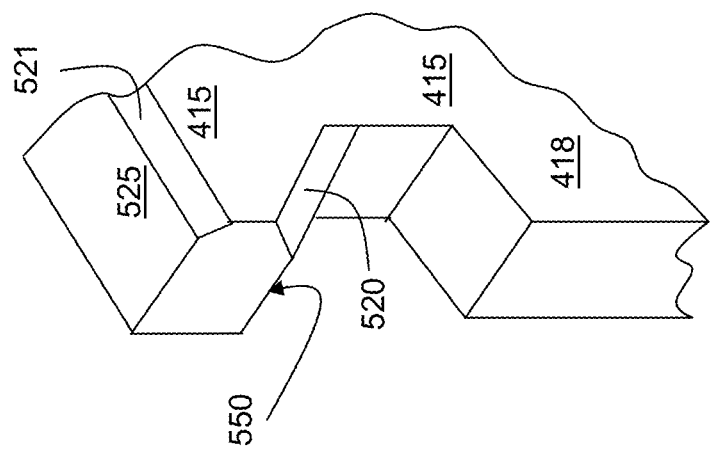

LAMINATED ROTOR MACHINING ENHANCEMENT

BACKGROUND OF THE INVENTION

The subject matter disclosed herein relates generally to a rotor structure of an electric machine such as a generator. More particularly, the invention relates to an electric machine having a laminated rotor structure including chamfers on the laminations to reduce smearing.

Generators typically include a stator and a rotor, the rotor rotating about a longitudinal axis within the stator to convert mechanical energy into electrical energy. The stator typically includes windings from which electrical power is output.

The rotor includes radially cut slots about the circumference of the rotor body, which extend lengthwise along the rotor body. These slots contain the coils which form the rotor field windings for carrying current. The rotor field windings are supported in place against centrifugal forces by using one of a number of different systems including, e.g., coil wedges which bear against the slot surfaces. The regions of the coils which extend beyond the ends of the rotor body are referred to as end windings, and are supported against centrifugal forces by retaining rings. The portion of the rotor shaft forging which is located under the rotor end windings is referred to as the spindle.

Rotors may be formed from a solid single forging of high strength iron or steel, which provide the rotor with the required bending stiffness to support the rotor both statically and to transmit torque from the rotor to a drive flange of the generator for successful operation of a large, high speed generator. These solid single-forging rotors are expensive to produce, and limited production capacity may result in long lead times for ordering and manufacture.

Laminated rotor bodies have been used in some electric machines such as generators and motors to alleviate the expense and lead time associated with solid steel rotors. These laminated rotor bodies comprise laminations placed on, or attached to, a single steel shaft, such that the shaft provides the required bending stiffness for the rotor. Laminated rotor bodies have also been used in electric machines in which the stack of laminations is held in compression by a series of rods that pass through holes in the periphery of the laminations.

After assembly of a laminated rotor, surfaces that serve as mechanical load transfer interfaces typically need machining to avoid stress concentration, and likelihood of resultant failure. Additional machining may be needed to form and/or shape mating surfaces between the rotor and wedges which hold the windings in place. Further, the assembled rotor may have excessive radial runout, which may require machining of the outer diameter of the rotor body to reduce to an acceptable level. The machining that the rotor may undergo following assembly may result in smearing, or electrical contact between laminations, across insulation layers between laminations.

BRIEF DESCRIPTION OF THE INVENTION

A first aspect of the disclosure provides a rotor comprising a lamination stack including a plurality of stacked laminations. Each lamination has a first thickness, and includes a plurality of radially extending slots arranged about a circumference of each of the plurality of laminations, and a first chamfer on a surface of each of the plurality of radially extending slots, wherein the surface mates with a wedge, and wherein the chamfer connects the surface and a first face of the lamination. At least one stud member passes longitudinally through at least one hole in the lamination stack, a first end flange member on a first end of the lamination stack, and a second end flange member on a second end of the lamination stack. A first fastener is affixed to a first end of each of the at least one stud member; and a second fastener is affixed to a second end of each of the at least one stud member. The first fastener and the second fastener provide compression to the laminated stack. A plurality of coils are positioned within the plurality of slots.

A second aspect of the disclosure provides an electric machine comprising a rotor and a stator surrounding the rotor. The rotor includes a lamination stack including a plurality of stacked laminations. Each lamination has a first thickness, and includes a plurality of radially extending slots arranged about a circumference thereof, and a first chamfer on a surface of each of the plurality of radially extending slots, wherein the surface mates with a wedge, and wherein the chamfer connects the surface and a first face of the lamination. At least one stud member passes longitudinally through at least one hole in the lamination stack, a first end flange member on a first end of the lamination stack, and a second end flange member on a second end of the lamination stack. A first fastener is affixed to a first end of each of the at least one stud member; and a second fastener is affixed to a second end of each of the at least one stud member. The first fastener and the second fastener provide compression to the laminated stack. A plurality of coils are positioned within the plurality of slots.

A third aspect of the disclosure provides a lamination for forming a rotor body comprising: a plurality of radially extending slots arranged about a circumference of the lamination; a first chamfer on a surface of each of the plurality of radially extending slots, wherein the surface mates with a rotor wedge, and wherein the chamfer connects the surface and a first face of the lamination; and at least one hole in the lamination for a stud member to pass through.

These and other aspects, advantages and salient features of the invention will become apparent from the following detailed description, which, when taken in conjunction with the annexed drawings, where like parts are designated by like reference characters throughout the drawings, disclose embodiments of the invention.

BRIEF DESCRIPTION OF THE DRAWINGS

FIGS. 9-10 show front views of a portion of a rotor body lamination and wedge.

FIG. 11 shows a perspective view of a portion of lamination according to one embodiment of the invention.

FIG. 12 shows a side orthographic view of a portion of a lamination according to one embodiment of the invention.

FIG. 17 shows a perspective view of a portion of lamination according to one embodiment of the invention.

FIG. 18 shows a side orthographic view of a portion of a lamination according to one embodiment of the invention.

FIGS. 19-20 show side orthographic views of a portion of a laminated rotor body stack according to embodiments of the invention.

DETAILED DESCRIPTION OF THE INVENTION

At least one embodiment of the present invention is described below in reference to its application in connection with the operation of an electric machine. Although embodiments of the invention are illustrated relative to an electric machine in the form of a generator, it is understood that the teachings are equally applicable to other electric machines including, but not limited to, motors. Further, at least one embodiment of the present invention is described below in reference to a nominal size and including a set of nominal dimensions. However, it should be apparent to those skilled in the art that the present invention is likewise applicable to any suitable generator and/or motor. Further, it should be apparent to those skilled in the art that the present invention is likewise applicable to various scales of the nominal size and/or nominal dimensions.

Figure 1:
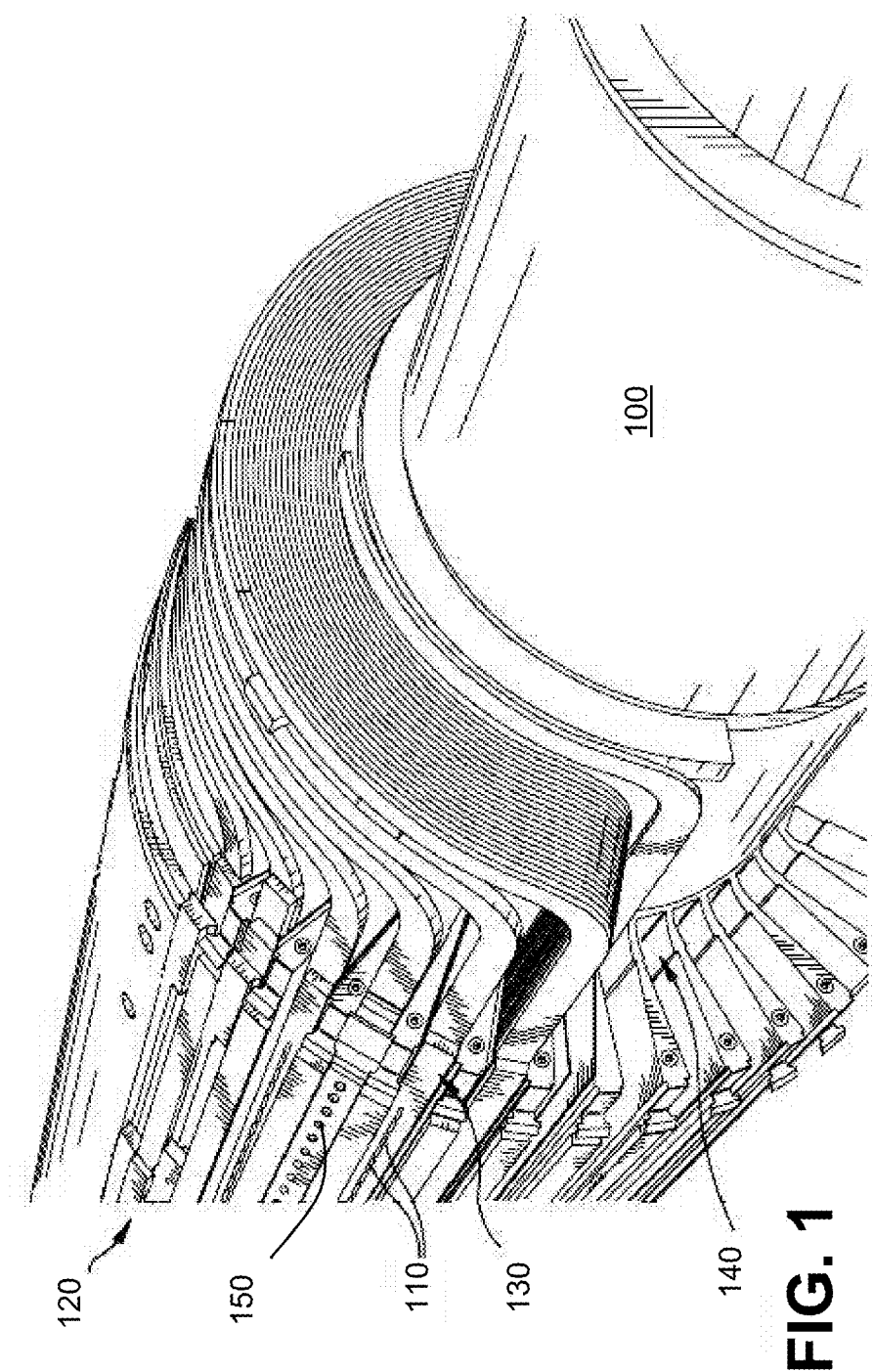
FIG. 1 depicts a three-dimensional view of a portion of a generator rotor according to embodiments of the invention.
Figure 2:
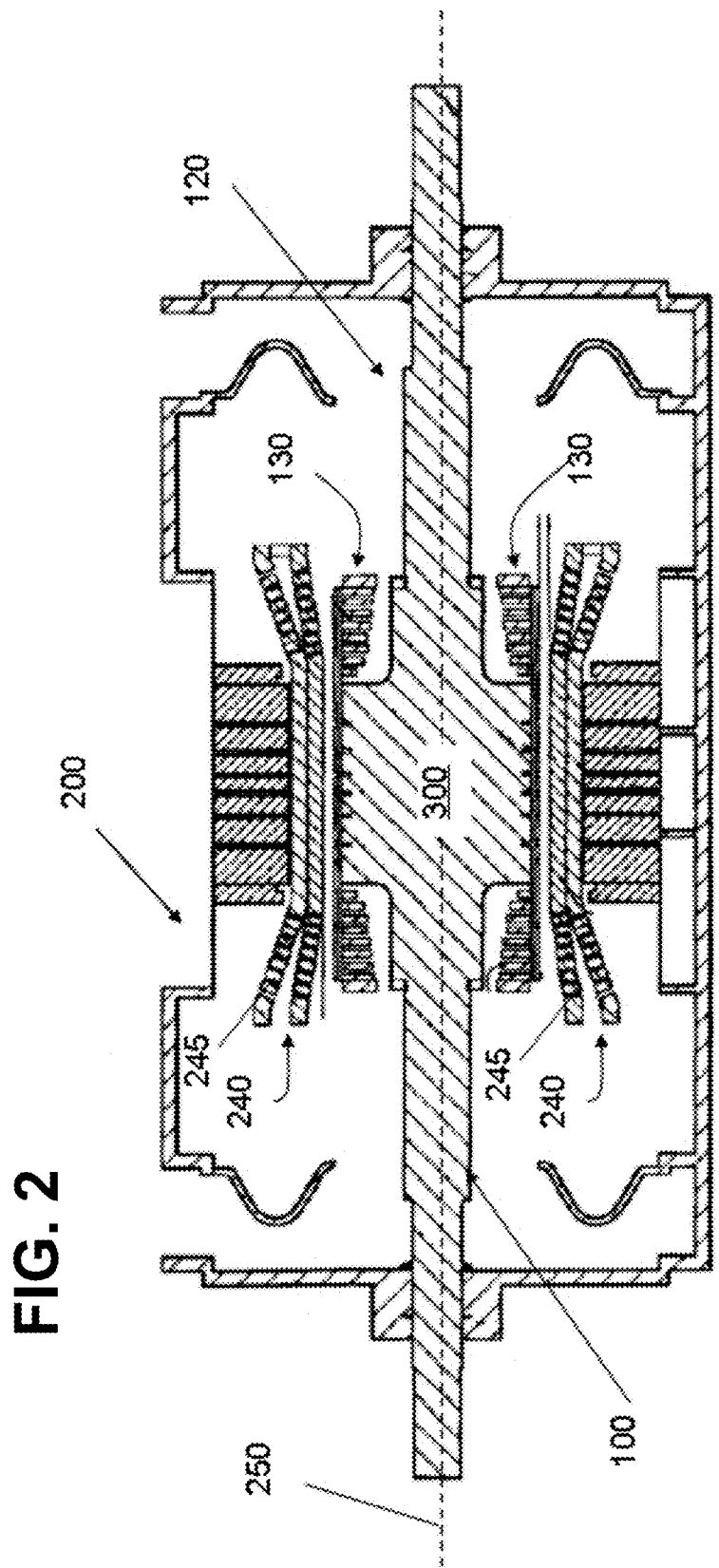
FIG. 2 shows a cross-sectional view of a generator having a rotor and a stator according to embodiments of the invention.
Figure 3:
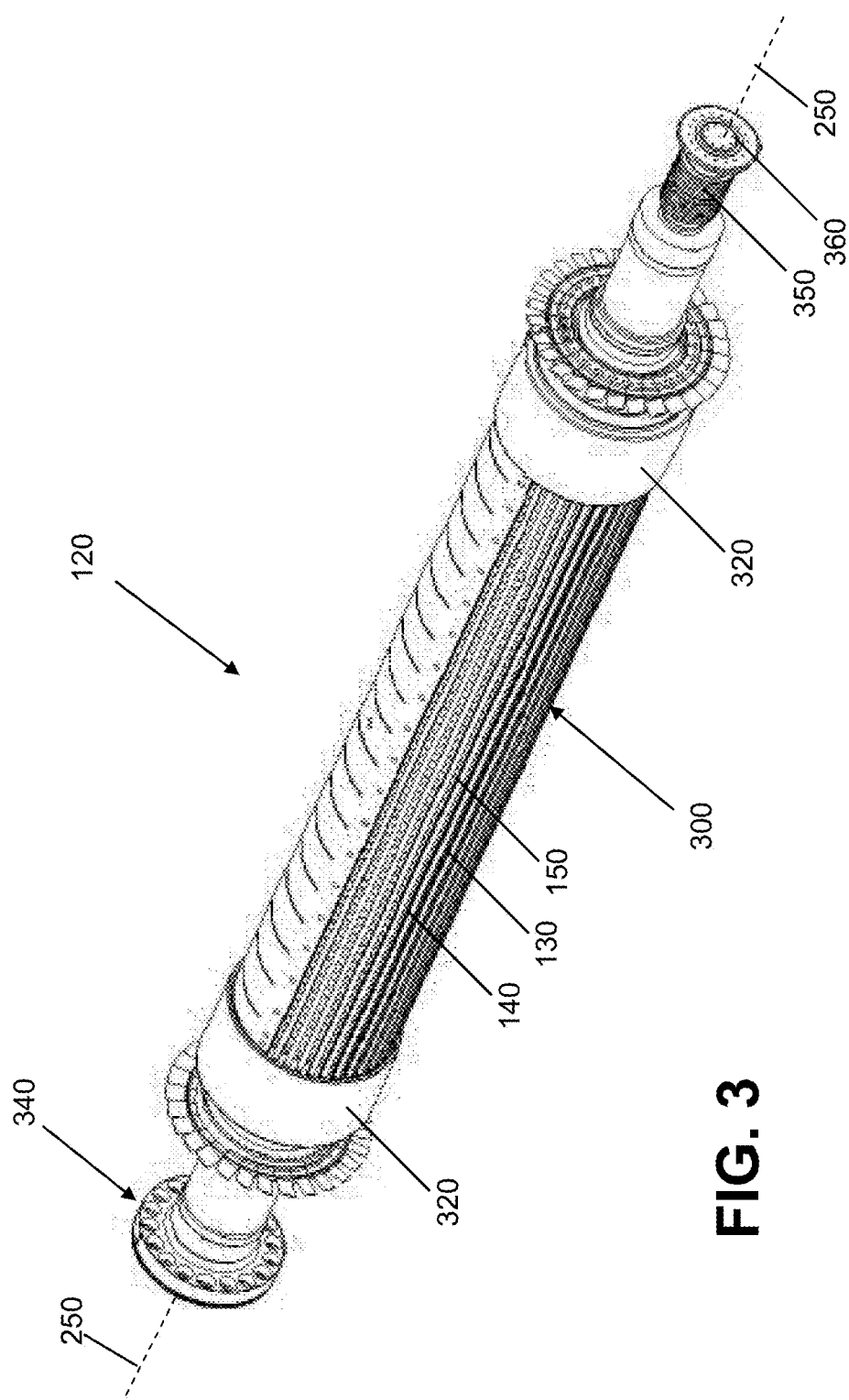
FIG. 3 shows a perspective view of a generator rotor including rotor field windings according to embodiments of the invention.

As indicated above, aspects of the invention provide a laminated rotor body. FIGS. 1-3 show different aspects of a generator. In particular, FIG. 1 shows a three-dimensional perspective view of a portion of rotor 120, in an embodiment which may be included in, e.g., a two pole synchronous generator. Rotor 120 may include a spindle 100 and groups of coils 130 disposed about spindle 100. Each group of coils 130 may be contained within a plurality of slots 140, and retained therein by coil wedges 150. Further, each group of coils 130 may contain a plurality of ducts 110 to assist in cooling coils 130. Further aspects of the generator and rotor 120 will be described with reference to FIGS. 1-13.

FIG. 2 shows a cross-sectional schematic view of a generator 200, including stator 240, and rotor 120 positioned within stator 240. Stator 240 includes groups of coils 245, and may comprise any now known or later developed stator structure. As shown, rotor 120 may include spindle 100 and groups of coils 130 disposed about spindle 100. Spindle 100 may be formed of, for example, iron or steel. Rotor 120 rotates about a longitudinal axis 250 within stator 240. Rotor 120 further includes rotor body 300, which comprises a multi-pole magnetic core. In rotor 120 depicted in FIG. 2, the magnetic core includes two poles.

Rotor body 300 further includes a plurality of slots 140 which contain coils 130, forming the rotor field winding. As shown in FIG. 1, in an embodiment, coils 130 may be held in place within slots 140 by coil wedges 150. Coils 130 are further held in place by retaining rings 320 on each end of rotor body 300, as depicted in FIG. 3. In other embodiments, coils 130 may be held in place by carbon fiber rings or fiberglass banding (not shown), in which the uncured fiberglass banding material is wound under tension directly over rotor 120 and coils 130, and then cured.

Drive coupling 340, shown in FIG. 3, may be disposed between generator 200 and a source of mechanical energy, which may include a turbine or engine, and is configured to rotate rotor 120 with respect to stator 240. Rotation of rotor 120 results in an electrical current being created in groups of coils 245 affixed to stator 240 (FIG. 2), generating electricity. The current is then transmitted away from generator 200 for use in a variety of applications including, for example, powering homes and/or buildings.

Figure 4:
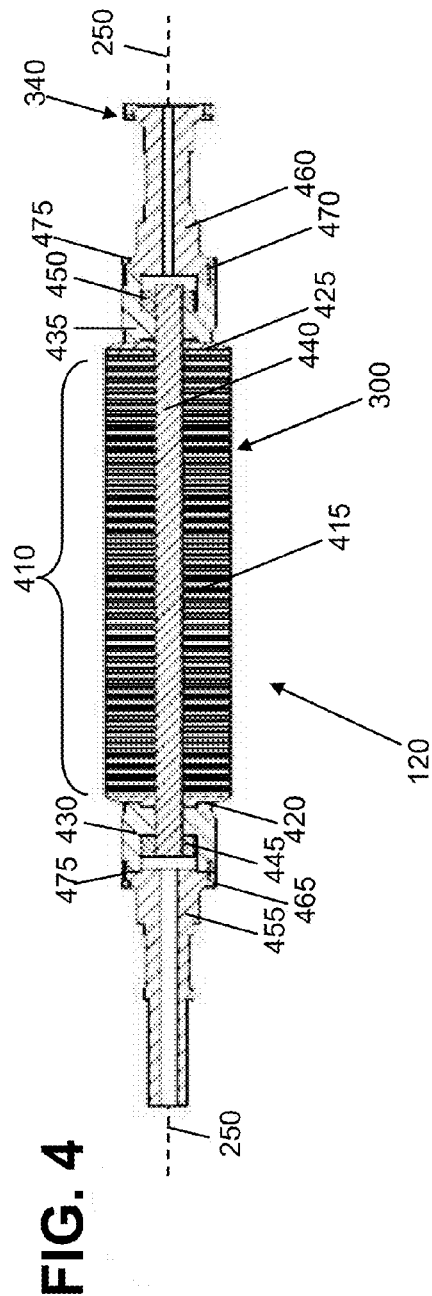
FIG. 4 shows a cross-sectional view of a generator rotor according to embodiments of the invention.

FIG. 4 shows rotor 120 according to an embodiment of the present invention, in which rotor body 300 comprises a stack 410 of a plurality of laminated plates, or laminations 415. The thickness of each lamination 415 varies with the size of generator 200. In one embodiment, each lamination 415 has a first thickness measuring about 0.9525 cm (about 0.375 inch). This is merely one possible thickness of each lamination 415, however, and is only illustrative, and not intended to exclude the use of laminations that are either thinner or thicker than described. The necessary and/or optimal thickness of the laminations 415 varies with the slip speed, power, and size of the electric machine in which they are used and the manufacturing method used to cut the laminations. The exemplary size of approximately 0.9525 cm thick laminations 415 may be suitable for, e.g., an approximately 100 megawatt generator. A generator with greater output power may utilize thinner laminations 415 than about 0.9525 cm. Typically, laminations 415 are thicker than laminations which may make up stator 240. In one embodiment, stator 240 may comprises a plurality of stacked laminations in a fashion similar to rotor 120, wherein each of the plurality of laminations is about 0.036 cm (about 0.014 in.) thick.

Referring back to FIG. 4, lamination stack 410 is flanked by a first end flange member 420 located on a first end of lamination stack 410, and by a second end flange member 425 located on a second end of lamination stack 410. First and second end flange members 420 and 425 may be, but need not be, part of the magnetically active portion of rotor 120 comprising rotor body 300.

Figure 5:
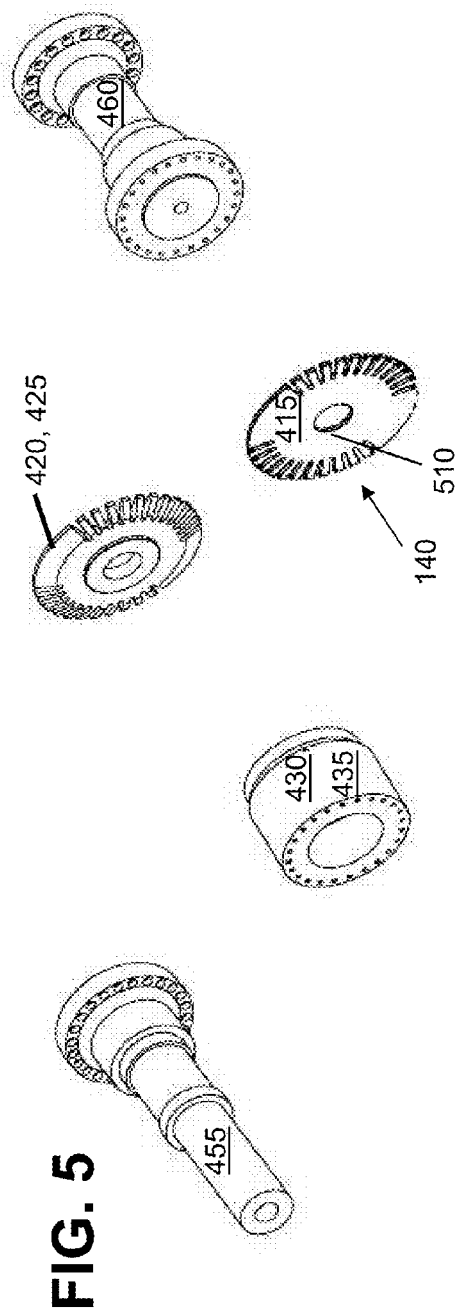
FIG. 5 shows a perspective view of various parts of the generator rotor according to embodiments of the invention.

In an embodiment, lamination stack 410 and first and second end flange members 420 and 425 may further be flanked by a first spacer member 430 located adjacent to the first end flange member 420, and a second spacer member 435 located adjacent to the second end flange member 425. As shown in FIG. 5, end flange members 420, 425 and spacer members 430, 435 each further include a hole passing therethrough. In another embodiment, end flange members 420, 425 may include spacer members 430, 435, respectively, as constituent parts of the structure of the end flange members 420, 425. In such an embodiment, a separate spacer members 430, 435 may not be used. In yet another embodiment, spacer members 430, 435 and end flange members 420, 425 may each comprise a plurality of sub-components which together form the spacer member or end flange member structures as shown in FIG. 5.

Referring back to FIG. 4, stud member 440 passes through hole 510 in each of the stacked laminations 415 that comprises lamination stack 410, as well as through the holes in each of the first and second end flange members 420 and 425, and first and second spacer members 430 and 435 (if present). Stud member 440 comprises a high strength material which is able to maintain very high compression such as, for example, steel. In a further embodiment, stud member 440 may be threaded only on each of the ends of stud member 440. First fastener 445 and second fastener 450 secure each of the ends of stud member 440, and, together with stud member 440, provide compression to laminated stack 410. Fasteners 445 and 450, which may include nuts, torque nuts or torque bolts, or other threaded fasteners, may be tightened using any known means including but not limited to: use of hydraulic tensioning equipment, heat tightening, and so on.

As shown in FIG. 5, in one embodiment, first end flange member 420 and second end flange member 425 may be shaped to provide nearly uniform pressure over an entirety of a cross section of the lamination stack 410, the first and second end flange members 420, 425 being tapered in thickness such that the outer diameter of each flange 420, 425 initially contacts the outer diameter of lamination stack 410. As the compression load increases upon tightening of fasteners 445, 450, each end flange member 420, 425 deforms so the entire face of flange 420, 425 is in contact with the entire face of the ends of the lamination stack 410.

Tightening of fasteners 445, 450 results in compression of laminated stack 410 at a pressure sufficient to provide the necessary bending stiffness to rotor body 300 and sufficient frictional capability to transmit a torque load from rotor body 300 to a drive shaft. The pressure necessary to accomplish this varies with the size of generator 200, and consequently, with the size of rotor 120. Larger machines require increased rotor stiffness, approaching that of a solid steel rotor. The pressures achieved are highly dependent on a variety of variables including but not limited to: the size of the rotor, the materials from which it is made, the extent to which fasteners 445, 450 are tightened, and so on.

As shown in FIG. 4, a non-drive end shaft spindle 455 may be affixed to first spacer member 430, and a drive end shaft spindle 460 may be affixed to the second spacer member 435. In various embodiments, spacer members 430, 435 each include a flange 465, 470 to which spindles 455, 460 may be affixed, respectively. In a further embodiment, spindles 455, 460 may be affixed to spacer members 430, 435 by a plurality of bolts 475, although any known method of fixation such as welding may also be used. In further embodiments, drive end spindle 460 includes drive coupling 340 (FIG. 3), and is configured to operably connect rotor 120 to a source of mechanical energy such as, for example, a turbine, causing rotor 120 to rotate. In certain embodiments, it may be desirable to have two sources of mechanical energy connected to rotor 120, one connected to each end of the rotor. In this case spindle 455 may also be configured to have an auxiliary drive coupling 360 (FIG. 3) operably connected to rotor 120. Non-drive end spindle 455 is configured to operably connect coils 130 with coil collector rings 350 (FIG. 3), which are disposed about spindle 455 (FIG. 4), or a brushless exciter (not shown) to provide excitation current to the rotor coils 130.

Figure 6:
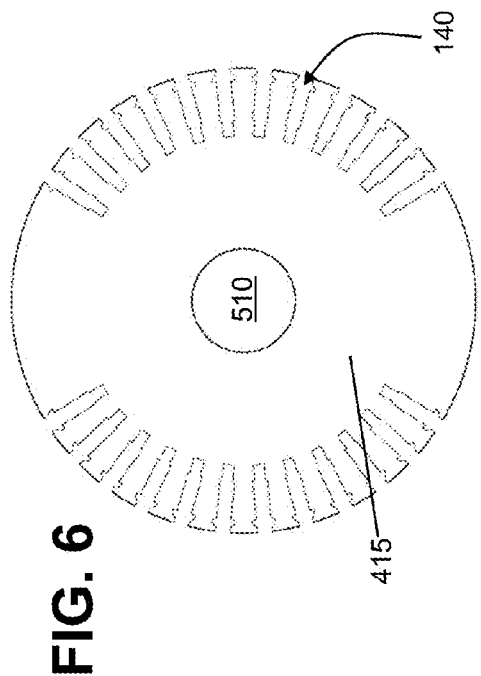
FIGS. 6-7 show front views of rotor body laminations according to two embodiments of the invention.
Figure 7:
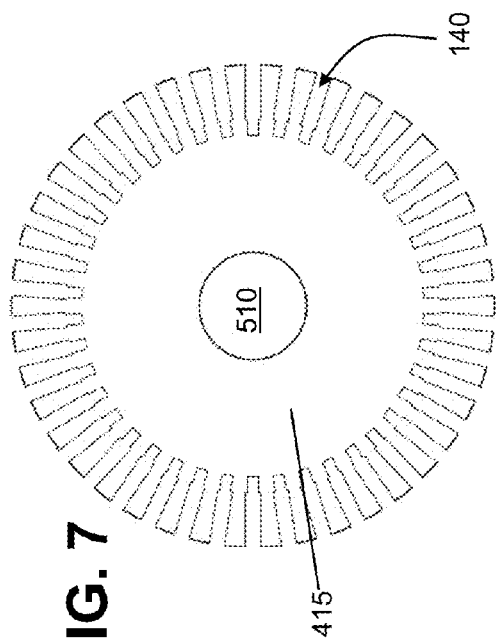

As shown in FIGS. 5-7, each lamination 415 includes a plurality of radially extending slots 140 circumferentially arranged about at least a portion of the circumference of each lamination 415. FIG. 6 depicts an embodiment of a slot arrangement suited to a two pole synchronous generator. FIG. 7 depicts an embodiment of a slot arrangement suited to an asynchronous generator rotor having a three phase winding.

Figure 8:
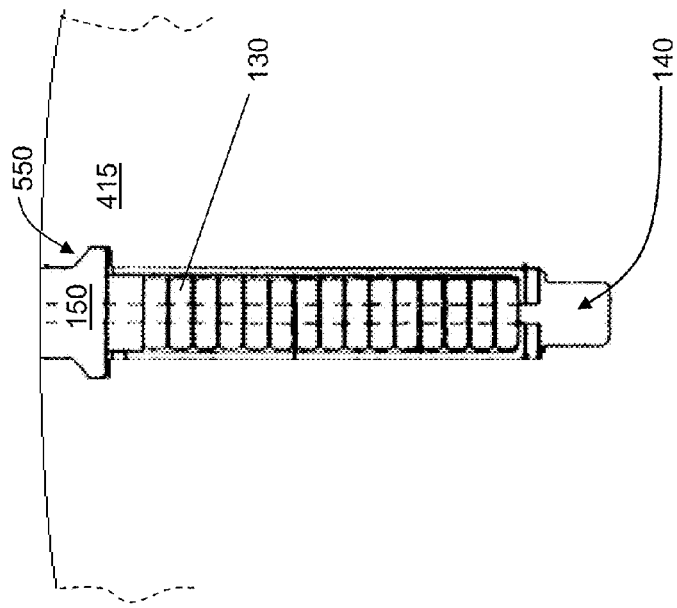
FIG. 8 shows a front detail view of a slot in a rotor body lamination according to one embodiment of the invention.

As further shown in FIGS. 5-7, each lamination 415 further includes a hole 510 passing through the lamination. In various embodiments, the number of holes 510 may be one or greater than one. In further embodiments, laminations 415 are made of steel, and may be cut using any known method, including but not limited to machining, cutting with a laser, cutting with a water jet, or punching with a die. In still further embodiments, the laminations may undergo further processing to coat the surface of each lamination with an insulating coating 370 (see FIGS. 10-13) to provide electrical isolation between adjacent laminations 415. One possible insulating coating may be a phosphate based inorganic coating in accordance with ASTM C-5 electrical steel insulation. Other possible insulating coatings may include EB 500FF C-6, EB5001 C-6, EB5300 C-5, among other possible insulating coatings. In some embodiments, insulating coating 370 may measure between about 0.001 mm and about 0.020 mm in thickness. The laminations 415 depicted in FIGS. 6-8 show embodiments in which rotor coils 130 are held in place within slots 140 by coil wedges 150, however other embodiments may include, e.g., carbon fiber rings or fiberglass banding to hold coils 130 in slots 140 as discussed above.

Figure 13:
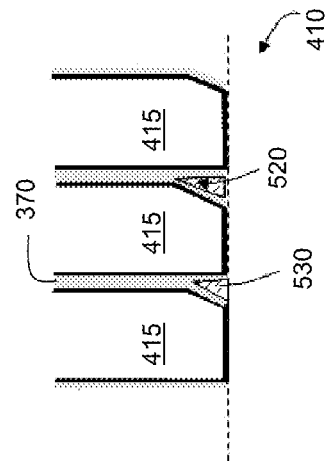
FIGS. 13-14 show a cross-sectional view cut along plane A-A (labeled in FIG. 10) of a portion of a laminated rotor body prior and after machining, respectively, in accordance with an embodiment of the invention.
Figure 14:
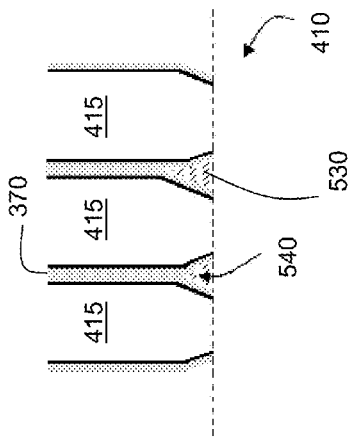

Referring to FIGS. 9-10, laminations 415 include surface 550 in slot 140, where lamination 415 mates with wedge 150. Lamination 415 may be machined to create surface 550 and so avoid concentration of stress at points along the interface with wedge 150 (FIG. 9). As shown in FIGS. 11-14, surface 550 may include first chamfer 520. First chamfer 520 connects surface 550 and a first face 418 of the lamination (FIG. 11) on an angle which may be approximately 45° in one embodiment. Other embodiments in which the angle is more or less than 45° are also used. First chamfer 520 may be cut along line B-B (labeled in FIG. 10) such that first chamfers 520 physically separate successive laminations 415 in a stack 410 of laminations as shown in FIGS. 13-14.

FIGS. 13-14 show a view of laminations 415 cut along plane A-A (labeled in FIG. 10). As shown in FIG. 13, first chamfers 520 may be filled with insulating material 530 to further aid in avoiding smearing across insulating coatings 370 between laminations 415, which may take place during machining of, e.g., surface 550. In one embodiment, insulating material 530 may be epoxy. FIG. 14 shows laminations 415 from the same view as FIG. 13 (along plane A-A as labeled in FIG. 10). In FIG. 14, laminations 415 have been machined to create surface 550.

Figure 15:
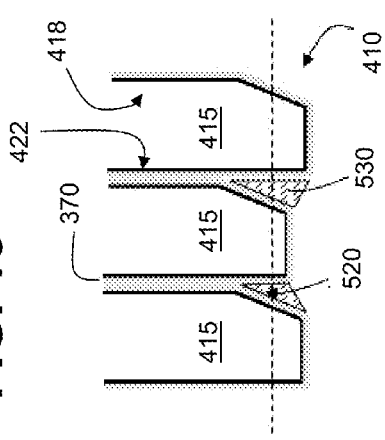
FIGS. 15-16 show a cross-sectional view cut along plane A-A (labeled in FIG. 10) of a portion of a laminated rotor body prior and after machining, respectively, in accordance with an embodiment of the invention.
Figure 16:
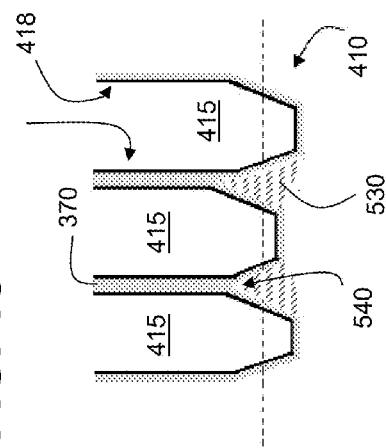
Figure 20:
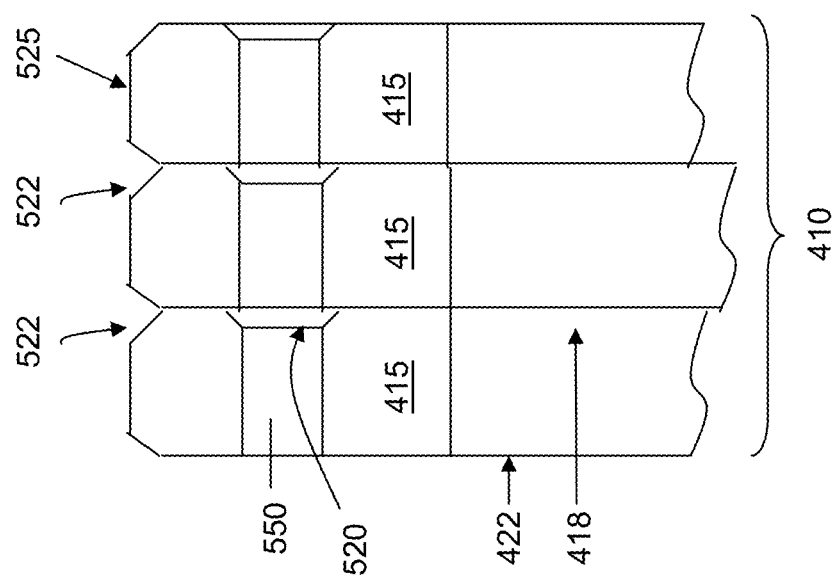
Figure 22:
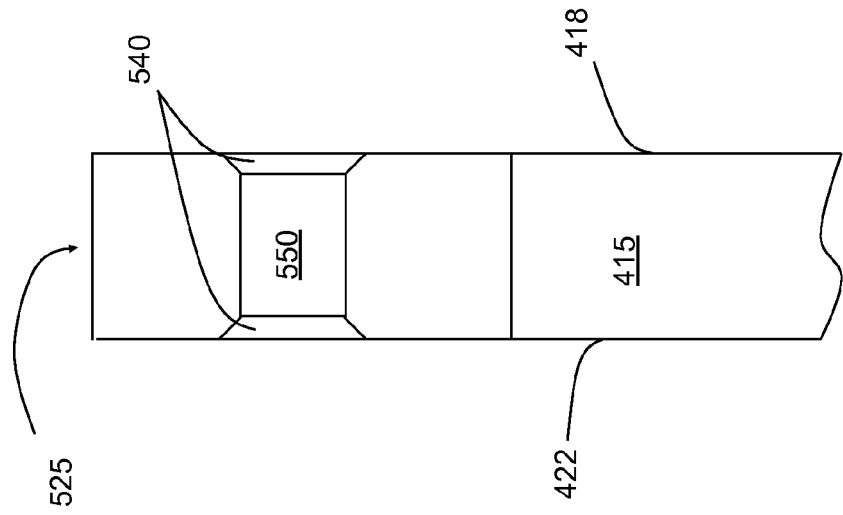
FIG. 22 shows a side orthographic view of a portion of a lamination according to the embodiment of the invention shown in, e.g., FIG. 15.
Figure 21:
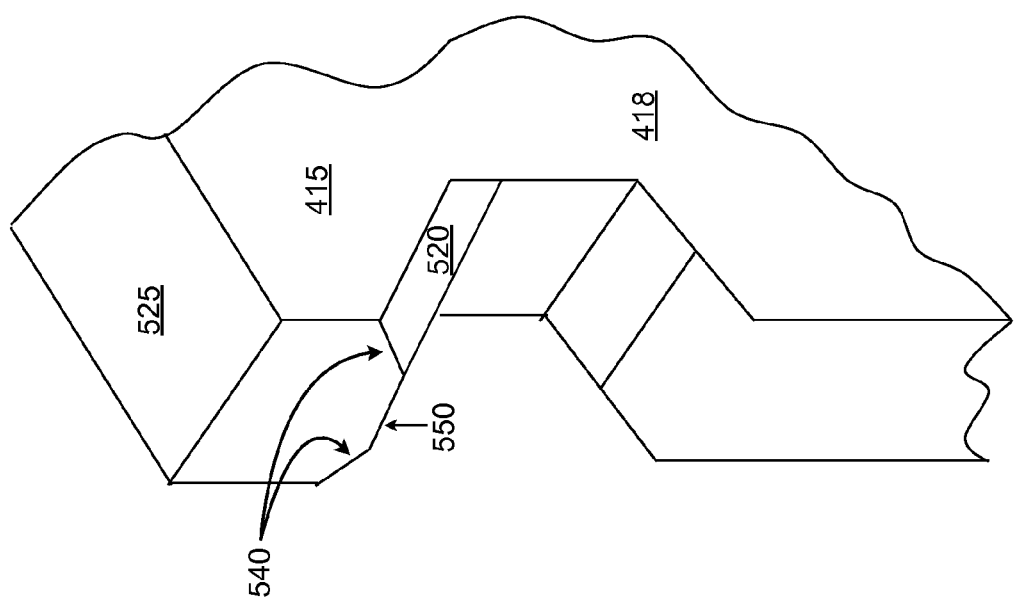
FIG. 21 shows a perspective view of a portion of a rotor body lamination according to the embodiment of the invention shown in, e.g., FIG. 15.

In a further embodiment, depicted in FIGS. 15-16, double sided, i.e., symmetrical first chamfers 540 may be used instead of the single sided, i.e., asymmetrical first chamfers 520 illustrated in FIGS. 11-14. Double-sided first chamfer 540 connects surface 550 with first face 418 of lamination 415 and second, opposing face 422 of lamination 415 (FIG. 15). Double-sided first chamfers 540 provide for increased axial distance between laminations 415 and may further decrease likelihood of smearing. Like single-sided chamfers 520, double-sided first chamfers 540 may be filled with insulating material 530 and machined (FIGS. 15-16) as described above.

In a further embodiment, depicted in FIGS. 17-20, laminations 415 may additionally include second chamfer 521 at an outer diameter of lamination 415. Second chamfer 521 connects first face 418 of lamination 415 with outer circumference surface 525 of lamination 415. Where assembled rotor body 300 (FIG. 4) requires machining to reduce radial runout and improve rotor balance, second chamfer 521 may reduce the occurrence of smearing across laminations 415 by increasing the axial distance between the laminations 415 at the outer diameter of stack 410. FIGS. 17-19 depict a single sided chamfer 521, however, a double sided second chamfer 522 (FIG. 20) may also be used to further increase axial distance between laminations 415 as described above relative to double-sided first chamfer 540 on surface 550. As discussed above, second chamfers 521, 522 may also be filled with insulating material 530.

Also provided is a method for forming a rotor body 300 in accordance with embodiments of the invention. A rotor body 300 is assembled, including assembling a stack 410 of a plurality of laminations 415, and inserting a stud member 440 through a hole 510 in each of the plurality of laminations 415. Each of the plurality of laminations 415 includes a plurality of radially extending slots 140 arranged about a circumference of each of the plurality of laminations 415. When assembled into stack 410, laminations 415 are positioned such that slots 140 in successive laminations 415 in the stack 410 are aligned. Each of the plurality of laminations 415 may further include a first chamfer 520 on a face of each of the laminations 415, or a first chamfer 540 on both faces of each of the laminations 415. In some embodiments, first chamfer 520 may be filled with an insulating material 530, which may be an epoxy. In further embodiments, second chamfers 521, 522 may be provided at the outer diameter of each lamination 415, which may be single- or double-sided.

A number of surfaces of the assembled rotor body 300 may be machined, for a variety of purposes, including, e.g., surface 550 of lamination 415, at the interface between wedge 150 and lamination 415 (see FIG. 9) and the outer circumference surface 525 of rotor body 300 (FIGS. 17-19). FIGS. 13-16 provide a more detailed view of the machining of the laminations 415 to achieve uniform contacts. In some embodiments, the step of filling first chamfers 520, 540 and second chamfers 521, 522 if present in each of the plurality of laminations 415 with insulating material 530 occurs after assembly of rotor body 300 but prior to machining at least one surface of laminations 415/rotor body 300.

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 25 mm, or, more specifically, about 5 mm to about 20 mm," is inclusive of the endpoints and all intermediate values of the ranges of "about 5 mm to about 25 mm," etc.).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A rotor comprising:
    a lamination stack including a plurality of stacked laminations, wherein each lamination includes:
        a first face; a second, opposing face; and a circumferential surface;
        a plurality of radially extending slots arranged about a circumference of each of the plurality of laminations, each slot including a radially inward-facing surface configured to mate with a wedge, and
        a first chamfer on the radially inward-facing surface of each of the plurality of radially extending slots, wherein the first chamfer connects the radially inward-facing surface and the first face of the lamination;
    a stud member passing longitudinally through at least one hole in the lamination stack, a first end flange member on a first end of the lamination stack, and a second end flange member on a second end of the lamination stack;
    a first fastener affixed to a first axial end of the stud member;
    a second fastener affixed to a second axial end of the stud member;
    the first fastener and the second fastener providing a compression to the laminated stack; and
    a plurality of coils positioned within the plurality of slots.

2. The rotor of claim 1, wherein the first chamfer is filled with an insulating material.

3. The rotor of claim 2, wherein the insulating material comprises an epoxy.

4. The rotor of claim 1, wherein the first chamfer further comprises a double-sided chamfer, wherein the double-sided chamfer includes an angled chamfer surface connecting the radially inward-facing surface with the first face of the lamination, and an angled chamfer surface connecting the radially inward-facing surface with the second, opposing face of the lamination.

5. The rotor of claim 1, wherein each of the plurality of laminations is coated with an insulating coating.

6. The rotor of claim 1, further comprising a second chamfer connecting the first face of the lamination with the circumferential surface of the lamination.

7. The rotor of claim 6, wherein the second chamfer further comprises a double sided chamfer, wherein the double-sided chamfer includes an angled chamfer surface that connects the circumferential surface with the first face of the lamination and an angled chamfer surface connecting the circumferential surface with the second, opposing face of the lamination.

8. An electric machine comprising:
    a rotor including:
        a lamination stack including a plurality of stacked laminations, wherein each lamination includes:
            a first face; a second, opposing face; and a circumferential surface;
            a plurality of radially extending slots arranged about a circumference thereof, each slot including a radially inward-facing surface configured to mate with a wedge, and
            a first chamfer on the radially inward-facing surface of each of the plurality of radially extending slots, wherein the first chamfer connects the radially inward-facing surface and the first face of the lamination;
        a stud member passing longitudinally through at least one hole in the lamination stack, a first end flange member on a first end of the lamination stack, and a second end flange member on a second end of the lamination stack;
        a first fastener affixed to a first axial end of the stud member;
        a second fastener affixed to a second axial end of the stud member;
        the first fastener and the second fastener providing a compression to the laminated stack;
        a plurality of coils positioned within the plurality of slots; and
    a stator surrounding the rotor.

9. The electric machine of claim 8, wherein the first chamfer is filled with an insulating material.

10. The electric machine of claim 9, wherein the insulating material comprises an epoxy.

11. The electric machine of claim 8, wherein the first chamfer further comprises a double-sided chamfer, wherein the double-sided chamfer includes an angled chamfer surface connecting the radially inward-facing surface with the first face of the lamination, and an angled chamfer surface connecting the radially inward-facing surface with the second, opposing face of the lamination.

12. The electric machine of claim 8, wherein each of the plurality of laminations is about 0.95 cm thick.

13. The electric machine of claim 8, wherein each of the plurality of laminations is coated with an insulating coating.

14. The electric machine of claim 8, further comprising a second chamfer connecting the first face of the lamination with the circumferential surface of the lamination.

15. The electric machine of claim 14, wherein the second chamfer further comprises a double sided chamfer, wherein the double-sided chamfer includes an angled chamfer surface that connects the circumferential surface with the first face of the lamination and an angled chamfer surface connecting the circumferential surface with the second, opposing face of the lamination.

16. A lamination for forming a rotor body comprising:

a first face; a second, opposing face; and a circumferential surface;

a plurality of radially extending slots arranged about a circumference of the lamination, each slot including a radially inward-facing surface configured to mate with a wedge;

a first chamfer on the radially inward-facing surface of each of the plurality of radially extending slots, wherein the first chamfer connects the radially inward-facing surface and the first face of the lamination;

at least one hole in the lamination for a stud member to pass through.

17. The lamination of claim 16, wherein the first chamfer further comprises a double-sided chamfer, wherein the double-sided chamfer includes an angled chamfer surface connecting the radially inward-facing surface with the first face of the lamination, and an angled chamfer surface connecting the radially inward-facing surface with the second, opposing face of the lamination.

18. The lamination of claim 16, wherein the lamination is coated with an insulating coating.

19. The lamination of claim 16, further comprising a second chamfer connecting the first face of the lamination with the circumferential surface of the lamination.

20. The lamination of claim 16, wherein the second chamfer further comprises a double sided chamfer, wherein the double-sided chamfer includes an angled chamfer surface that connects the circumferential surface with the first face of the lamination and an angled chamfer surface connecting the circumferential surface with the second, opposing face of the lamination.

* * * * *

UNITED STATES PATENT AND TRADEMARK OFFICE
CERTIFICATE OF CORRECTION

PATENT NO. : 9,190,879 B2  
APPLICATION NO. : 13/823054  
DATED : November 17, 2015  
INVENTOR(S) : Semenov et al.

Page 1 of 1

It is certified that error appears in the above-identified patent and that said Letters Patent is hereby corrected as shown below:

On the Title Page, in Item (75), under "Inventors", in Column 1, Line 8, delete "Vinitsky," and insert -- Vinitzky, --, therefor.

Signed and Sealed this  
Fifteenth Day of March, 2016

Michelle K. Lee  
*Director of the United States Patent and Trademark Office*